(12) United States Patent
Lu et al.

(10) Patent No.: US 11,552,973 B2
(45) Date of Patent: Jan. 10, 2023

(54) NETWORK MALICIOUS BEHAVIOR DETECTION METHOD AND NETWORKING SYSTEM USING SAME

(71) Applicant: QNAP SYSTEMS, INC., New Taipei (TW)

(72) Inventors: Charng-Da Lu, New Taipei (TW); Shih-Chan Huang, New Taipei (TW); Shih-Ming Hu, New Taipei (TW)

(73) Assignee: QNAP SYSTEMS, INC., New Taipei (TW)

( * ) Notice: Subject to any disclaimer, the term of this patent is extended or adjusted under 35 U.S.C. 154(b) by 272 days.

(21) Appl. No.: 17/015,977

(22) Filed: Sep. 9, 2020

(65) Prior Publication Data
US 2022/0070192 A1 Mar. 3, 2022

(30) Foreign Application Priority Data
Sep. 1, 2020 (TW) ................................. 109129811

(51) Int. Cl.
*H04L 9/40* (2022.01)
*H04L 43/50* (2022.01)

(52) U.S. Cl.
CPC .......... *H04L 63/1425* (2013.01); *H04L 43/50* (2013.01); *H04L 63/0245* (2013.01); *H04L 63/1441* (2013.01)

(58) Field of Classification Search
CPC . H04L 63/1425; H04L 43/50; H04L 63/0245; H04L 63/1441; H04L 63/1416;
(Continued)

(56) References Cited

U.S. PATENT DOCUMENTS 7,251,215 B1 * 7/2007 Turner ................ H04L 12/4633
370/231
7,809,826 B1 * 10/2010 Guruswamy ......... H04L 43/026
709/224

(Continued)

FOREIGN PATENT DOCUMENTS

TW          I436631       5/2014
WO       2015027523       3/2015

OTHER PUBLICATIONS

Uceda et al., "Selective Capping of Packet Payloads at Multi-GB/s Rates," IEEE Journal on Selected Areas in Communications Year: 2016 | vol. 34, Issue: 6 | Journal Article | Publisher: IEEE.*

(Continued)

*Primary Examiner* — Roderick Tolentino
(74) *Attorney, Agent, or Firm* — Guice Patents PLLC

(57) ABSTRACT

A network malicious behavior detection method, including: checking each piece of network packet to determine whether a protocol payload contained therein matches an element in a predetermined protocol payload set, marking each piece of the network packet as a suspicious network packet if the check result is true, and transferring each piece of the network packet to a target device if the check result is false; and performing a malicious behavior checking process on at least one piece of the suspicious network packet, blocking the transfer of at least one piece of the suspicious network packet to the target device if the check result is true, and enabling the transfer of at least one piece of the suspicious network packet to the target device if the check result is false.

12 Claims, 6 Drawing Sheets

(58) Field of Classification Search
CPC ............. H04L 63/1408; H04L 63/0227; H04L 63/1466; G06F 21/577; G06F 21/564
See application file for complete search history.

(56) References Cited

U.S. PATENT DOCUMENTS

| | | | |
|---|---|---|---|
| 8,621,060 B2 | 12/2013 | McClure et al. | |
| 10,212,178 B2* | 2/2019 | Cheng | H04L 67/303 |
| 2014/0198790 A1* | 7/2014 | Christenson | H04L 43/10 |
| | | | 370/392 |
| 2015/0264078 A1* | 9/2015 | Beauchesne | H04L 63/1441 |
| | | | 726/23 |
| 2017/0063682 A1* | 3/2017 | Lentczner | H04L 12/4625 |
| 2019/0132346 A1* | 5/2019 | Christian | H04L 63/0245 |
| 2020/0186557 A1* | 6/2020 | Ishikawa | H04L 63/1425 |
| 2020/0204574 A1* | 6/2020 | Christian | H04L 63/12 |
| 2020/0267170 A1* | 8/2020 | Mohanta | G06N 20/00 |

OTHER PUBLICATIONS

Li et al., "Word Embedding-based Context-sensitive Network Flow Payload Anomaly Detection," 2021 3rd International Conference on Applied Machine Learning (ICAML) Year: 2021 | Conference Paper | Publisher: IEEE.*

* cited by examiner

NETWORK MALICIOUS BEHAVIOR DETECTION METHOD AND NETWORKING SYSTEM USING SAME

BACKGROUND OF THE INVENTION

Field of the Invention

The present invention relates to a method for ensuring network security, more particularly to a method capable of detecting malicious behaviors on the network without affecting the transfer speed of normal packets.

Description of the Related Art

To maintain the confidentiality, integrity and availability of the network system, it is a common practice to use a network switch to monitor network packets for detecting malicious behaviors or network attacks.

However, it is really difficult to inspect the entire content of the network packets in today's high-speed network environment.

To ensure network security, the Chinese patent WO2015027523 proposes a method and device for detecting TCP port scan attacks by actively responding to received network packets.

In addition, Taiwan patent 1436631 proposes a method and device for detecting port scans containing fake source addresses. The patent finds out the real network source address from which a port scan attack is initiated by actively responding to received network packets.

In addition, the U.S. Pat. No. 8,621,060B2 "System and method for network vulnerability detection and reporting" detects security loopholes in network devices by actively sending out network packets.

However, as the aforementioned patents all have to actively respond to received network packets, the information processing resources on the network are therefore still at risk of being occupied by malicious devices.

To solve the aforementioned problems, a novel method for detecting malicious behaviors on the network is needed.

SUMMARY OF THE INVENTION

1. One objective of the present invention is to disclose a network malicious behavior detection method, which can provide a firewall effect with almost zero impact on network traffic and network speed through a two-stage filtering process.

2. Another objective of the present invention is to disclose a network malicious behavior detection method, which filters malicious packets in a passive way of not responding to received packets, so it can affect the transfer speed of normal network packets in a much less degree than the traditional ways of actively responding to received packets.

To achieve the foregoing objectives, a network malicious behavior detection method is proposed, which is implemented by a networking system having a path control module, a packet characteristic extraction module, a mirroring module, a packet characteristic checking module and a packet behavior analysis module, and the method includes:

using the packet characteristic extraction module to get data in at least one layer of each piece of network packet to generate a characteristic data segment for each piece of the network packet, the layer being selected from a group consisting of the network layer, the transmission layer and the data link layer;

using the packet characteristic checking module to check each piece of the characteristic data segment to determine whether a protocol payload contained therein matches an element in a predetermined protocol payload set, if the check result is true, drive the mirroring module to generate a mirror packet according to a piece of the network packet corresponding to the check result, and if the check result is false, drive the path control module to enable a piece of the network packet corresponding to the check result to be transferred to a target device; and using the packet behavior analysis module to perform a malicious behavior detecting process on at least one piece of the mirror packet, if the check result is true, drive the path control module to block the transfer of at least one piece of the network packet corresponding to the check result to the target device, and if the check result is false, drive the path control module to enable at least one piece of the network packet corresponding to the check result to be transferred to the target device.

In one embodiment, the predetermined protocol payload set includes an ARP payload, an ICMP payload, a TCP payload with a SYN being 1, and a UDP payload with a destination network address containing a port number of 53.

In possible embodiments, the malicious behavior may be that a plurality of the mirror packets with a same source address but different destination addresses appear within a predetermined period of time, or a plurality of the mirror packets with a same source address, a same destination address but different port addresses appear within a predetermined period of time, or a piece of the mirror packet having a source address in a blacklist, or a piece of the mirror packet having a source address not found in a whitelist.

In one embodiment, the network malicious behavior detection method further includes: using a traffic flow detection module to let all the network packets be put into the packet behavior analysis module to undergo the malicious behavior checking process when a detected traffic flow of the network packets is lower than a threshold.

In one embodiment, the network malicious behavior detection method further includes: using the packet characteristic extraction module to execute a flow detection process to obtain a traffic flow value of the network packets, and let each piece of the network packet be processed by the mirroring module to generate a piece of the mirror packet when the traffic flow value is lower than a threshold.

In one embodiment, the network malicious behavior detection method further includes: using the packet characteristic checking module to execute a flow detection process to obtain a traffic flow value of the characteristic data segments, and let each piece of the network packet be processed by the mirroring module to generate a piece of the mirror packet when the traffic flow value is lower than a threshold.

To achieve the above objectives, the present invention further provides a networking system for a network, and the networking system has a path control module, a packet characteristic extraction module, a mirroring module, a packet characteristic checking module and a packet behavior analysis module for executing a network malicious behavior detection method, the method including:

using the packet characteristic extraction module to get data in at least one layer of each piece of network packet to generate a characteristic data segment for each piece of the network packet, the layer being selected from a group consisting of the network layer, the transmission layer and the data link layer;

using the packet characteristic checking module to check each piece of the characteristic data segment to determine whether a protocol payload contained therein matches an element in a predetermined protocol payload set, if the check result is true, drive the mirroring module to generate a mirror packet according to a piece of the network packet corresponding to the check result, and if the check result is false, drive the path control module to enable a piece of the network packet corresponding to the check result to be transferred to a target device; and using the packet behavior analysis module to perform a malicious behavior detecting process on at least one piece of the mirror packet, if the check result is true, drive the path control module to block the transfer of at least one piece of the network packet corresponding to the check result to the target device, and if the check result is false, drive the path control module to enable at least one piece of the network packet corresponding to the check result to be transferred to the target device.

In one embodiment, the path control module, the packet characteristic extraction module, and the mirroring module are implemented in a switch or a router.

In one embodiment, the packet characteristic checking module and the packet behavior analysis module are implemented in a same information processing device or different information processing devices.

In one embodiment, the predetermined protocol payload set includes an ARP payload, an ICMP payload, a TCP payload with a SYN being 1, and a UDP payload with a destination network address containing a port number of 53.

In possible embodiments, the malicious behavior may be that a plurality of the mirror packets with a same source address but different destination addresses appear within a predetermined period of time, or a plurality of the mirror packets with a same source address, a same destination address but different port addresses appear within a predetermined period of time, or a piece of the mirror packet having a source address in a blacklist, or a piece of the mirror packet having a source address not found in a whitelist.

In one embodiment, the blacklist includes a network address or a domain name of a command-and-control server associated with a malware.

In possible embodiments, the network malicious behavior detection method may further include: using a traffic flow detection module to let all the network packets be put into the packet behavior analysis module to undergo the malicious behavior checking process when a detected traffic flow of the network packets is lower than a threshold; or using the packet characteristic extraction module to execute a flow detection process to obtain a traffic flow value of the network packets, and let each piece of the network packet be processed by the mirroring module to generate a piece of the mirror packet when the traffic flow value is lower than a threshold; or using the packet characteristic checking module to execute a flow detection process to obtain a traffic flow value of the characteristic data segments, and let each piece of the network packet be processed by the mirroring module to generate a piece of the mirror packet when the traffic flow value is lower than a threshold.

In one embodiment, the network is a local area network.

To achieve the above objectives, the present invention further provides a network malicious behavior detection method, which is implemented by a networking system having a path control module, a packet characteristic checking module and a packet behavior analysis module, the method including:

using the packet characteristic checking module to check each piece of the network packet to determine whether a protocol payload contained therein matches an element in a predetermined protocol payload set, mark each piece of the network packet corresponding to the check result as a suspicious network packet if the check result is true, and drive a path control module to transfer each piece of the network packet corresponding to the check result to a target device if the check result is false; and using the packet behavior analysis module to perform a malicious behavior checking process on at least one piece of the suspicious network packet, drive the path control module to block the transfer of at least one piece of the suspicious network packet corresponding to the check result to the target device if the check result is true, and drive the path control module to enable the transfer of at least one piece of the suspicious network packet corresponding to the check result to the target device if the check result is false.

In one embodiment, the predetermined protocol payload set includes an ARP payload, an ICMP payload, a TCP payload with a SYN being 1, and a UDP payload with a destination network address containing a port number of 53.

In possible embodiments, the malicious behavior may be that a plurality of the mirror packets with a same source address but different destination addresses appear within a predetermined period of time, or a plurality of the mirror packets with a same source address, a same destination address but different port addresses appear within a predetermined period of time, or a piece of the mirror packet having a source address in a blacklist, or a piece of the mirror packet having a source address not found in a whitelist.

In possible embodiments, the network malicious behavior detection method may further include: using a traffic flow detection module to let all the network packets be put into the packet behavior analysis module to undergo the malicious behavior checking process when a detected traffic flow of the network packets is lower than a threshold; or using the packet characteristic checking module to execute a flow detection process to obtain a traffic flow value of the characteristic data segments, and let each piece of the network packet be processed by the mirroring module to generate a piece of the mirror packet when the traffic flow value is lower than a threshold.

To achieve the above objectives, the present invention further provides a networking system for a network, and the networking system has a path control module, a packet characteristic checking module and a packet behavior analysis module for executing a network malicious behavior detection method, the method including:

using the packet characteristic checking module to check each piece of the network packet to determine whether a protocol payload contained therein matches an element in a predetermined protocol payload set, mark each piece of the network packet corresponding to the check result as a suspicious network packet if the check result is true, and drive a path control module to transfer each piece of the network packet corresponding to the check result to a target device if the check result is false; and using the packet behavior analysis module to perform a malicious behavior checking process on at least one piece of the suspicious network packet, drive the path control module to block the transfer of at least one piece of the suspicious network packet corresponding to the check result to the target device if the check result is true, and drive the path control module to enable the transfer of at least one piece of the suspicious network packet corresponding to the check result to the target device if the check result is false.

In one embodiment, the predetermined protocol payload set includes an ARP payload, an ICMP payload, a TCP payload with a SYN being 1, and a UDP payload with a destination network address containing a port number of 53.

In possible embodiments, the malicious behavior may be that a plurality of the mirror packets with a same source address but different destination addresses appear within a predetermined period of time, or a plurality of the mirror packets with a same source address, a same destination address but different port addresses appear within a predetermined period of time, or a piece of the mirror packet having a source address in a blacklist, or a piece of the mirror packet having a source address not found in a whitelist.

In one embodiment, the blacklist includes a network address or a domain name of a command-and-control server associated with a malware.

In possible embodiments, the network malicious behavior detection method may further include: using a traffic flow detection module to let all the network packets be put into the packet behavior analysis module to undergo the malicious behavior checking process when a detected traffic flow of the network packets is lower than a threshold; or using the packet characteristic checking module to execute a flow detection process to obtain a traffic flow value of the characteristic data segments, and let each piece of the network packet be processed by the mirroring module to generate a piece of the mirror packet when the traffic flow value is lower than a threshold.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The principle of the present invention lies in:

First, determine a piece of the network packet to be a suspicious network packet if the network layer, the transport layer or the data link layer thereof contains a protocol payload commonly used by malicious network packets, where the protocol payload refers to the actual data contained in the network layer, the transport layer or the data link layer, and the actual data is usually packed with a header.

Second, perform a malicious behavior checking process on each piece of the suspicious network packet to determine whether to block the transfer path of the suspicious network packets, where the malicious behavior refers to the occurrence of multiple pieces of the suspicious network packet with a same source address but different target addresses within a predetermined period of time (IP scan attack), or the occurrence of multiple pieces of the suspicious network packet with a same source address, a same target address but different port addresses within a predetermined period of time (port scan attack), or the source address of a piece of the suspicious network packet is in a blacklist (access-prohibited list), or the source address of a piece of the suspicious network packet is not in a white list (access-permitted list), or multiple pieces of the suspicious network packet issued from a network device requesting a plurality of non-existing domain names within a predetermined period of time, or multiple pieces of the suspicious network packet issued from a network device requesting at least one non-existing domain name in every day of a plurality of consecutive days, or multiple pieces of the suspicious network packet issued from a plurality of network devices requesting at least one same non-existing domain name.

By utilizing the above-mentioned principle, the present invention can use a two-step filtering process to filter malicious packets in a passive manner without responding to received packets, and in the same time avoid compromising the transfer speed of normal network packets by adopting a short filtering process for the first step of the two-step filtering process.

Figure 1:
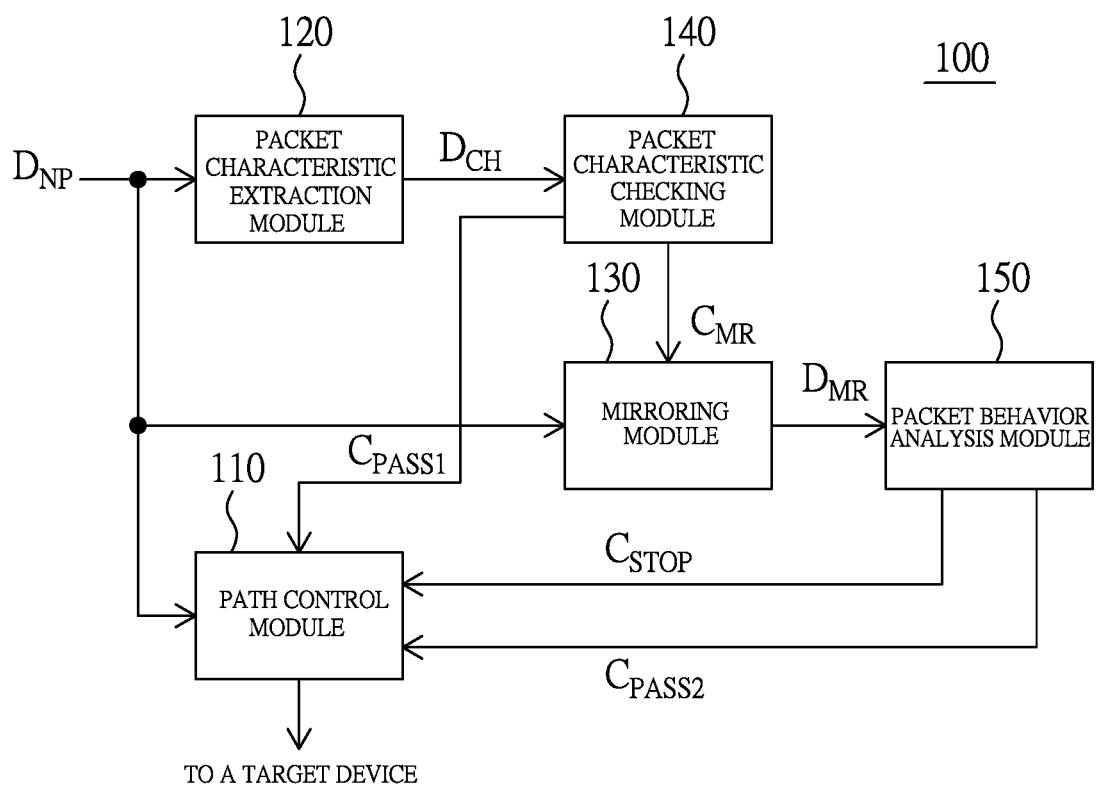
FIG. 1 illustrates a block diagram of an embodiment of the networking system of the present invention.

Please refer to FIG. 1, which illustrates a block diagram of an embodiment of the networking system of the present invention. As shown in FIG. 1, a switch system 100 includes a path control module 110, a packet characteristic extraction module 120, a mirroring module 130, a packet characteristic checking module 140, and a packet behavior analysis module 150. The networking system 100 is used to provide both a network packets switching function and a firewall function for multiple information processing devices on a network, for example but not limited to a local area network.

The path control module 110 is used to determine whether to allow a network packet $D_{NP}$ to be transferred to a target device according to a first permission command $C_{PASS1}$, a second permission command $C_{PASS2}$, and a blocking command $C_{STOP}$. When the first permission command $C_{PASS1}$ or the second permission command $C_{PASS2}$ is active, the path control module 110 will allow the network packet $D_{NP}$ to be transferred to the target device; when the blocking command $C_{STOP}$ is active, the path control module 110 will block the network packet $D_{NP}$ to stop its transfer to the target device.

The packet characteristic extraction module 120 is used to get the data of at least one layer of the group of the network layer, the transport layer, and the data link layer in the network packet $D_{NP}$ to generate a characteristic data segment $D_{CH}$.

The mirroring module 130 is used to send a mirror packet $D_{MR}$ of each suspicious network packet $D_{NP}$ to the packet behavior analysis module 150 under the control of a mirroring command $C_{MR}$.

The packet characteristic checking module 140 is used to check each piece of the characteristic data segment $D_{CH}$ to determine whether they have a protocol payload matching an element in a predetermined protocol payload set and generate the first permission command $C_{PASS1}$ or the mirroring command $C_{MR}$ accordingly, where, the predetermined protocol payload set includes ARP (address resolution protocol) payload, ICMP (internet control message protocol) payload, TCP (transmission control protocol) payload with SYN (synchronization flag) being 1, and UDP (user datagram protocol) payload with a destination network address containing a port number of 53, and when the characteristic data segment $D_{CH}$ has any of the abovementioned payloads (that is, when the network packet $D_{NP}$ corresponding to the characteristic data section $D_{CH}$ is a suspicious network packet), let the mirroring command $C_{MR}$ be active to enable the mirroring module 130 to generate a mirror packet $D_{MR}$ according to the network packet $D_{NP}$, and when the characteristic data segment $D_{CH}$ does not have any of the abovementioned payloads, let the first permission command $C_{PASS1}$ be active to drive the path control module 110 to transfer the network packet $D_{NP}$ to the target device.

The packet behavior analysis module 150 is used to perform a malicious behavior checking process on the mirror packets $D_{MR}$ to determine whether to block the transfer paths of the suspicious network packets $D_{NP}$ corresponding to the mirror packets $D_{MR}$, where, the malicious behavior refers to that the a plurality of the mirror packets with a same source address but different destination addresses appear within a predetermined period of time (IP scan attack), or a plurality of the mirror packets with a same source address, a same destination address but different port addresses appear within a predetermined period of time (port scan attack), or a piece of the mirror packet having a source address in a blacklist (access-prohibited list), the blacklist including a network address or a domain name of a command-and-control server associated with a malware, or a piece of the mirror packet having a source address not found in a whitelist (access-permitted list). When the packet behavior analysis module 150 determines that the transfer paths of the suspicious network packets $D_{NP}$ should be blocked, the blocking command $C_{STOP}$ will be active to prohibit the transfer of the suspicious network packets $D_{NP}$ to the target device; when the packet behavior analysis module 150 determines that the transfer paths of the suspicious network packets $D_{NP}$ should not be blocked, the second permission command $C_{PASS2}$ will be active to enable the suspicious network packets $D_{NP}$ to be transferred to the target device.

In addition, in possible embodiments, the path control module 110, the packet characteristic extraction module 120, and the mirroring module 130 can be implemented in a switch or a router, and the packet characteristic checking module 140 and the packet behavior analysis module 150 can be implemented in a same information processing device or different information processing devices; or the path control module 110, the packet characteristic extraction module 120, the mirroring module 130, the packet characteristic checking module 140 and the packet behavior analysis module 150 are implemented in a switch or a router.

Specifically, the networking system 100 can perform the following steps:

(1) Use the packet characteristic extraction module 120 to get data from the network layer and/or the transport layer and/or the data link layer in each network packet $D_{NP}$ to generate a characteristic data segment $D_{CH}$;

(2) Use the packet characteristic checking module 140 to check each characteristic data segment $D_{CH}$ to determine whether they have a protocol payload matching an element in a predetermined protocol payload set, and generate the first permission command $C_{PASS1}$ or the mirroring command $C_{MR}$ accordingly, where the predetermined protocol payload set includes ARP payload, ICMP payload, TCP payload with SYN being 1, and UDP payload with a target network address having a port number of 53, and when the characteristic data segment $D_{CH}$ has any of the abovementioned payloads (that is, when the network packet $D_{NP}$ corresponding to the characteristic data section $D_{CH}$ is a suspicious network packet), let the mirroring command $C_{MR}$ be active to enable the mirroring module 130 to generate a mirror packet $D_{MR}$ according to the network packet $D_{NP}$, and when the characteristic data segment $D_{CH}$ does not have any of the abovementioned payloads, let the first permission command $C_{PASS1}$ be active to drive the path control module 110 to transfer the network packet $D_{NP}$ to a target device; and (3) Use the packet behavior analysis module 150 to perform a malicious behavior checking process on the mirror packets $D_{MR}$ to determine whether to block the transfer paths of the suspicious network packets $D_{NP}$ corresponding to the mirror packets $D_{MR}$, where the malicious behavior refers to that the a plurality of the mirror packets with a same source address but different destination addresses appear within a predetermined period of time (IP scan attack), or a plurality of the mirror packets with a same source address, a same destination address but different port addresses appear within a predetermined period of time (port scan attack), or a piece of the mirror packet having a source address in a blacklist (access-prohibited list), the blacklist including a network address or a domain name of a command-and-control server associated with a malware, or a piece of the mirror packet having a source address not found in a whitelist (access-permitted list). When the packet behavior analysis module 150 determines that the transfer paths of the suspicious network packets $D_{NP}$ should be blocked, the blocking command $C_{STOP}$ will be active to prohibit the transfer of the suspicious network packets $D_{NP}$ to the target device; when the packet behavior analysis module 150 determines that the transfer paths of the suspicious network packets $D_{NP}$ should not be blocked, the second permission command $C_{PASS2}$ will be active to enable the suspicious network packets $D_{NP}$ to be transferred to the target device.

Besides, in possible embodiments, the malicious behavior can further include: a plurality of the mirror packets corresponding to a plurality of the network packets issued from a network device requesting a plurality of non-existing domain names within a predetermined period of time, for example, a network device requesting 10 non-existing domain names within one hour; or a plurality of the mirror packets corresponding to a plurality of the network packets issued from a network device requesting at least one non-existing domain name in every day of a plurality of consecutive days, for example, a network device requesting a non-existing domain name in every day of three consecutive days; or a plurality of the mirror packets corresponding to a plurality of the network packets issued from a plurality of network devices requesting at least one same non-existing domain name.

Figure 2:
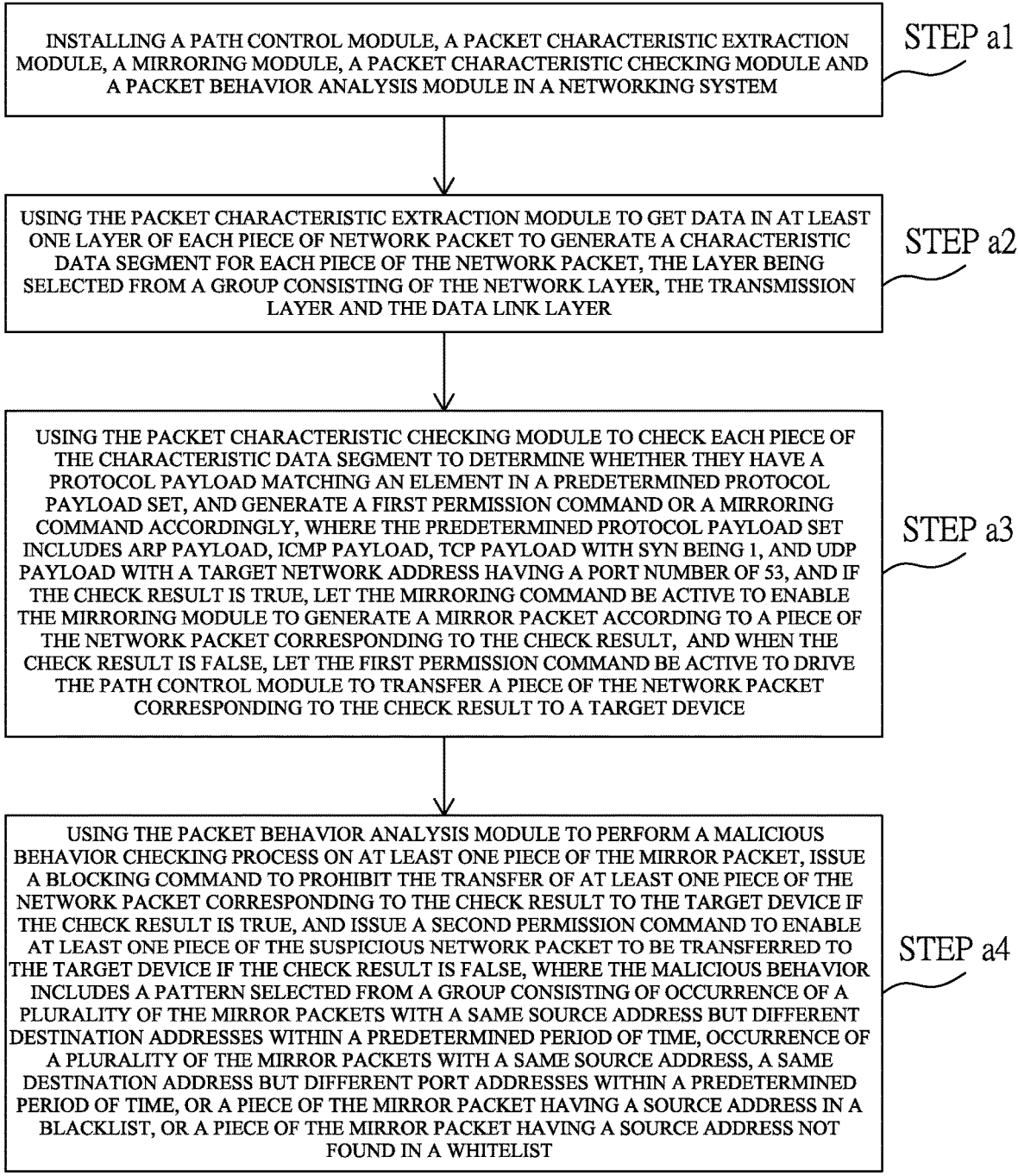
FIG. 2 illustrates a flowchart of an embodiment of the network malicious behavior detection method of the present invention.

That is, the networking system of FIG. 1 can implement a novel method for detecting malicious behaviors on a network. Please refer to FIG. 2, which illustrates a flowchart of an embodiment of the network malicious behavior detection method of the present invention. As shown in FIG. 2, the method includes: installing a path control module, a packet characteristic extraction module, a mirroring module, a packet characteristic checking module and a packet behavior analysis module in a networking system (step a1); using the packet characteristic extraction module to get data in at least one layer of each piece of network packet to generate a characteristic data segment for each piece of the network packet, the layer being selected from a group consisting of the network layer, the transmission layer and the data link layer (step a2); using the packet characteristic checking module to check each piece of the characteristic data segment to determine whether they have a protocol payload matching an element in a predetermined protocol payload set, and generate a first permission command or a mirroring command accordingly, where the predetermined protocol payload set includes ARP payload, ICMP payload, TCP payload with SYN being 1, and UDP payload with a target network address having a port number of 53, and if the check result is true, let the mirroring command be active to enable the mirroring module to generate a mirror packet according to a piece of the network packet corresponding to the check result, and when the check result is false, let the first permission command be active to drive the path control module to transfer a piece of the network packet corresponding to the check result to a target device (step a3); and using the packet behavior analysis module to perform a malicious behavior checking process on at least one piece of the mirror packet, issue a blocking command to prohibit the transfer of at least one piece of the network packet corresponding to the check result to the target device if the check result is true, and issue a second permission command to enable at least one piece of the suspicious network packet to be transferred to the target device if the check result is false, where the malicious behavior includes a pattern selected from a group consisting of occurrence of a plurality of the mirror packets with a same source address but different destination addresses within a predetermined period of time, occurrence of a plurality of the mirror packets with a same source address, a same destination address but different port addresses within a predetermined period of time, or a piece of the mirror packet having a source address in a blacklist, or a piece of the mirror packet having a source address not found in a whitelist (step a4).

Besides, in possible embodiments, the malicious behavior can further include: a plurality of the mirror packets corresponding to a plurality of the network packets issued from a network device requesting a plurality of non-existing domain names within a predetermined period of time, for example, a network device requesting 10 non-existing domain names within one hour; or a plurality of the mirror packets corresponding to a plurality of the network packets issued from a network device requesting at least one non-existing domain name in every day of a plurality of consecutive days, for example, a network device requesting a non-existing domain name in every day of three consecutive days; or a plurality of the mirror packets corresponding to a plurality of the network packets issued from a plurality of network devices requesting at least one same non-existing domain name.

Figure 3:
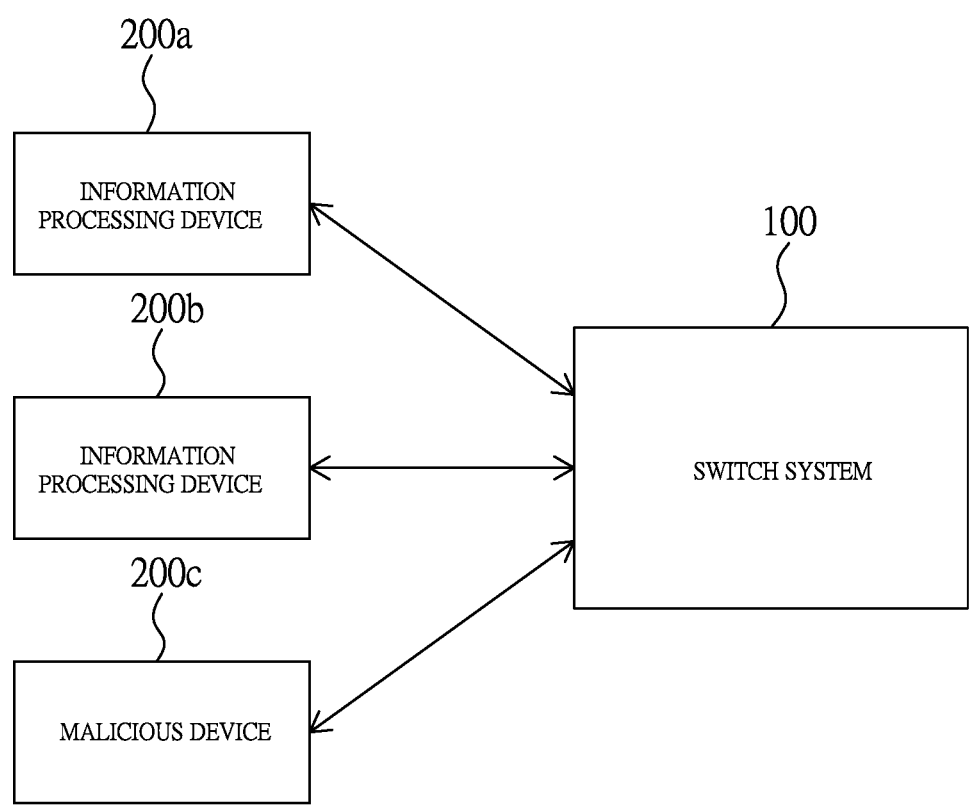
FIG. 3 illustrates an application example of the networking system of FIG. 1.
Figure 4A:
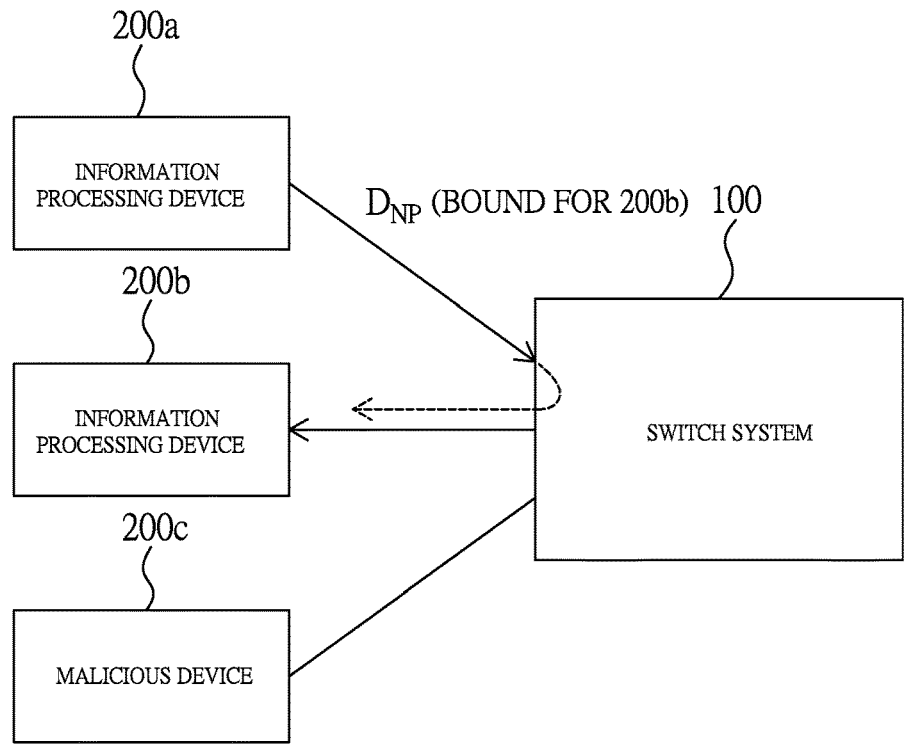
FIG. 4a illustrates a scenario of the networking system of FIG. 1 processing network communication between two normal information processing devices.
Figure 4B:
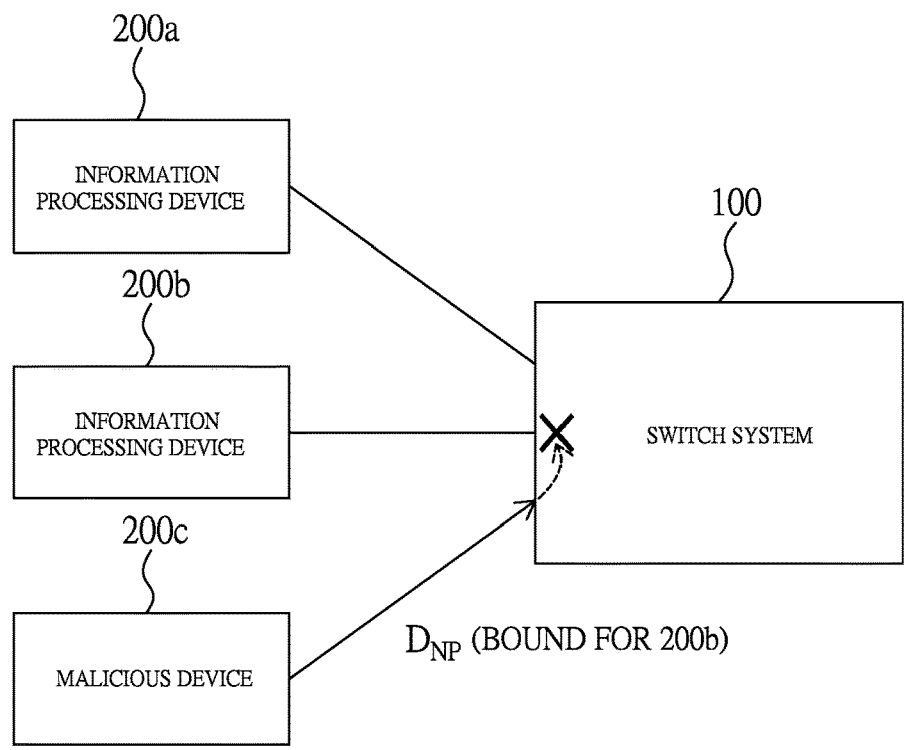
FIG. 4b illustrates a scenario of the networking system of FIG. 1 dealing with attacks by a malicious device on a normal information processing device.

In light of the above description, the present invention can effectively block attacks by malicious devices on normal information processing devices while minimizing the impact on the network access experience of normal information processing devices. Please refer to FIG. 3, which illustrates an application example of the networking system of FIG. 1. As shown in FIG. 3, the networking system 100 in this application example is coupled with information processing devices 200a, 200b and a malicious device 200c to process network packets sent by the information processing devices 200a, 200b and malicious device 200c, respectively. When in operation, please refer to FIG. 4a, when the information processing device 200a sends a network packet $D_{NP}$ bound for the information processing device 200b, that is, when normal information processing devices perform network communication between each other, the networking system 100 will let the network packet $D_{NP}$ be transferred to the information processing device 200b after executing the method of FIG. 2; and please refer to FIG. 4b, when the malicious device 200c issues a network packet $D_{NP}$ bound for the information processing device 200b, that is, a malicious device attacks a normal information processing device, the networking system 100 will intercept the network packet $D_{NP}$ after executing the method of FIG. 2.

In addition, under low traffic conditions, even all the network packets $D_{NP}$ are put into the packet behavior analysis module 150 to undergo the malicious behavior checking process, the network access experience will not be much affected. Therefore, in a possible embodiment, the networking system 100 may have a traffic flow detection function to put all the network packets $D_{NP}$ into the packet behavior analysis module 150 when the traffic flow of the network packets $D_{NP}$ is lower than a threshold. For example, the packet characteristic checking module 140 may have a flow detection process to obtain a traffic flow value of the characteristic data segments $D_{CH}$, and let each piece of the network packet $D_{NP}$ be processed by the mirroring module 130 to generate a piece of the mirror packet $D_{MR}$ when the traffic flow value is lower than a threshold; or use the packet characteristic extraction module 120 to perform a flow detection process to obtain a flow value of the network packets $D_{NP}$, and let each piece of the network packet $D_{NP}$ be processed by the mirroring module 130 to generate a piece of the mirror packet $D_{MR}$ when the traffic flow value is lower than a threshold; or further install a traffic flow detection module to detect a traffic flow value of the network packets $D_{NP}$ or characteristic data segments $D_{CH}$, and let each piece of the network packet $D_{NP}$ be processed by the mirroring module 130 to generate a piece of the mirror packet $D_{MR}$ when the traffic flow value is lower than a threshold.

Figure 5:
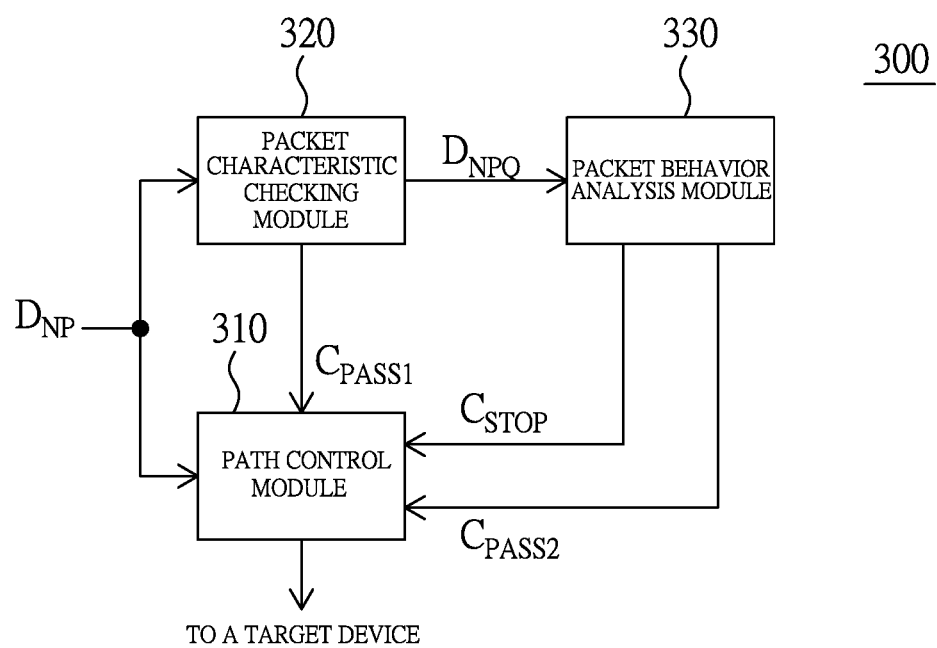
FIG. 5 illustrates a block diagram of another embodiment of the networking system of the present invention.

Based on the above detailed description, the present invention further provides another embodiment of the networking system of the present invention. Please refer to FIG. 5, which illustrates a block diagram of another embodiment of the networking system of the present invention. As shown in FIG. 5, a networking system 300 including a path control module 310, a packet characteristic checking module 320, and a packet behavior analysis module 330, is operable on a network (for example as but not limited to a local area network) to provide both a network packets switching function and a firewall function for multiple information processing devices. In possible embodiments, all the path control module 310, the packet characteristic checking module 320 and the packet behavior analysis module 330 are implemented in a switch (or a router); or the path control module 310 and the packet characteristic checking module 320 are implemented in a switch (or a router) and the packet behavior analysis module 330 is implemented in an information processing device; or the path control module 310 is implemented in a switch (or a router), and the packet characteristic checking module 320 and the packet behavior analysis module 330 are implemented in a same information processing device or different information processing devices.

The path control module 310 is used to determine whether to allow a network packet $D_{NP}$ to be transferred to a target device according to a first permission command $C_{PASS1}$, a second permission command $C_{PASS2}$, and a blocking command $C_{STOP}$. When the first permission command $C_{PASS1}$ or the second permission command $C_{PASS2}$ is active, the path control module 310 will allow the network packet $D_{NP}$ to be transferred to the target device; when the blocking command $C_{STOP}$ is active, the path control module 310 will block the network packet $D_{NP}$ to stop its transfer to the target device.

The packet characteristic checking module 320 is used to check each piece of the network packet $D_{NP}$ to determine whether they have a protocol payload matching an element in a predetermined protocol payload set, and if the check result is true, mark each piece of the network packet $D_{NP}$ corresponding to the check result as a suspicious network packet $D_{NPQ}$, and if the check result is false, make the first permission command $C_{PASS1}$ active to drive the path control module 310 to allow each piece of the network packet $D_{NP}$ to be transferred to a target device, where the predetermined protocol payload set includes ARP (address resolution protocol) payload, ICMP (internet control message protocol) payload, TCP (transmission control protocol) payload with SYN (synchronization flag) being 1, and UDP (user datagram protocol) payload with a destination network address containing a port number of 53.

The packet behavior analysis module 330 is used to perform a malicious behavior checking process on at least one piece of the suspicious network packet $D_{NPQ}$. If the check result is true, let the blocking command $C_{STOP}$ be active to drive the path control module 310 to prohibit at least one piece of the suspicious network packet $D_{NPQ}$ corresponding to the check result from being transferred to the target device; and if the check result is false, let the second permission command $C_{PASS2}$ be active to drive the path control module 310 to allow at least one piece of the suspicious network packet $D_{NPQ}$ corresponding to the check result to be transferred to the target device, where the malicious behavior refers to that a plurality of the suspicious network packets $D_{NPQ}$ with a same source address but different destination addresses appear within a predetermined period of time (IP scan attack), or a plurality of the suspicious network packets $D_{NPQ}$ with a same source address, a same destination address but different port addresses appear within a predetermined period of time (port scan attack), or a piece of the suspicious network packet $D_{NPQ}$ having a source address in a blacklist (access-prohibited list), the blacklist including a network address or a domain name of a command-and-control server associated with a malware, or a piece of the suspicious network packet $D_{NPQ}$ having a source address not found in a whitelist (access-permitted list).

Besides, in possible embodiments, the malicious behavior can further include: a plurality of the suspicious network packets issued from a network device requesting a plurality of non-existing domain names within a predetermined period of time, for example, a network device requesting 10 non-existing domain names within one hour; or a plurality of the suspicious network packets issued from a network device requesting at least one non-existing domain name in every day of a plurality of consecutive days, for example, a network device requesting a non-existing domain name in every day of three consecutive days; or a plurality of the suspicious network packets issued from a plurality of network devices requesting at least one same non-existing domain name.

Figure 6:
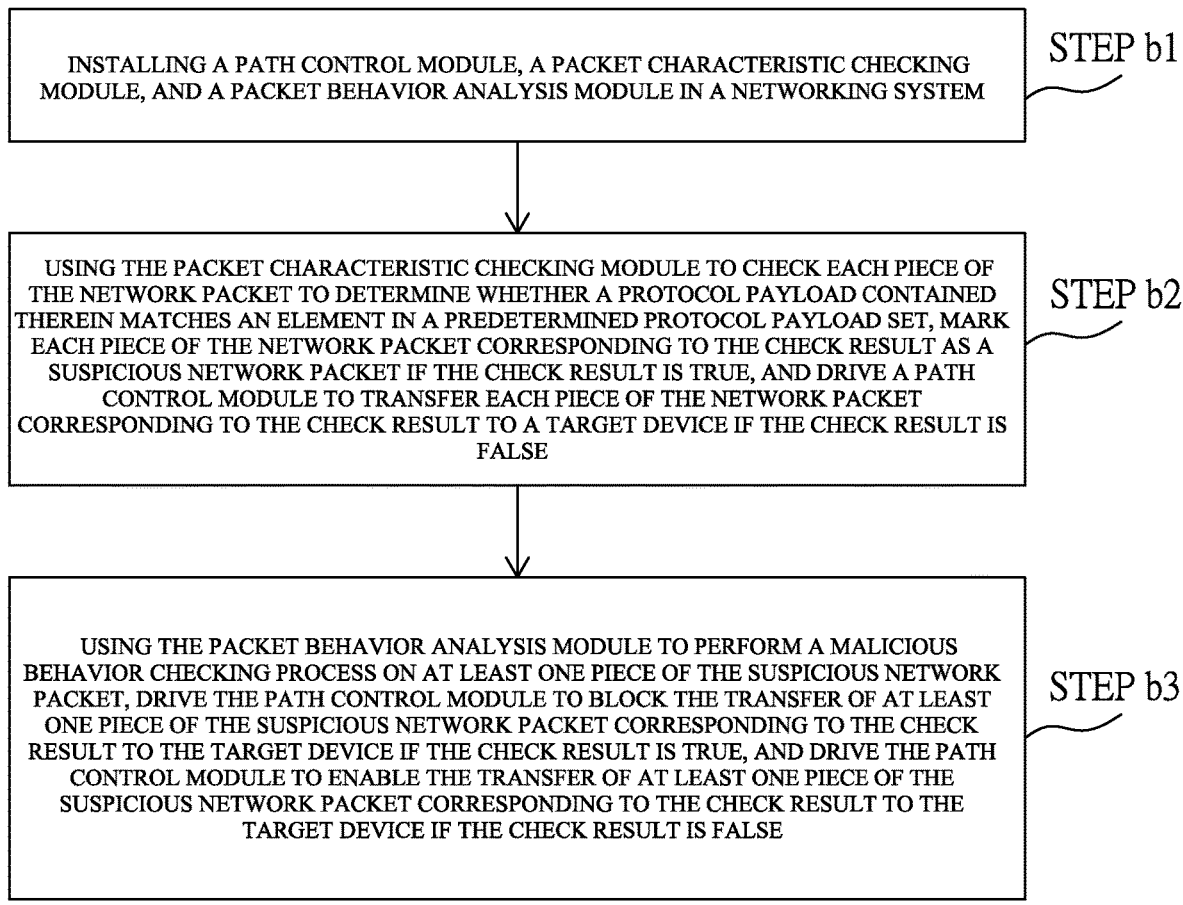
FIG. 6 illustrates a flowchart of another embodiment of the network malicious behavior detection method of the present invention.

Based on the proposal of FIG. 5, the present invention further provides another embodiment of the network malicious behavior detection method. Please refer to FIG. 6, which illustrates a flowchart of another embodiment of the network malicious behavior detection method of the present invention. As shown in FIG. 6, the method includes: installing a path control module, a packet characteristic checking module, and a packet behavior analysis module in a networking system (step b1); using the packet characteristic checking module to check each piece of the network packet to determine whether a protocol payload contained therein matches an element in a predetermined protocol payload set, mark each piece of the network packet corresponding to the check result as a suspicious network packet if the check result is true, and drive a path control module to transfer each piece of the network packet corresponding to the check result to a target device if the check result is false (step b2); and using the packet behavior analysis module to perform a malicious behavior checking process on at least one piece of the suspicious network packet, drive the path control module to block the transfer of at least one piece of the suspicious network packet corresponding to the check result to the target device if the check result is true, and drive the path control module to enable the transfer of at least one piece of the suspicious network packet corresponding to the check result to the target device if the check result is false (step b3).

In step b2, the predetermined protocol payload set includes ARP payload, ICMP payload, TCP payload with SYN being 1, and UDP payload with a target network address having a port number of 53.

In step b3, the malicious behavior refers to that a plurality of the suspicious network packets with a same source address but different destination addresses appear within a predetermined period of time, or a plurality of the suspicious network packets with a same source address, a same destination address but different port addresses appear within a predetermined period of time, or a piece of the suspicious network packet having a source address in a blacklist, the blacklist including a network address or a domain name of a command-and-control server associated with a malware, or a piece of the suspicious network packet having a source address not found in a whitelist.

Besides, in possible embodiments, the malicious behavior can further include: a plurality of the suspicious network packets issued from a network device requesting a plurality of non-existing domain names within a predetermined period of time, for example, a network device requesting 10 non-existing domain names within one hour; or a plurality of the suspicious network packets issued from a network device requesting at least one non-existing domain name in every day of a plurality of consecutive days, for example, a network device requesting a non-existing domain name in every day of three consecutive days; or a plurality of the suspicious network packets issued from a plurality of network devices requesting at least one same non-existing domain name.

Thanks to the aforementioned proposals, the present invention has the following advantages:

1. The network malicious behavior detection method of the present invention can provide a firewall effect with almost zero impact on network traffic and network speed by adopting a two-stage filtering process.

2. The network malicious behavior detection method of the present invention filters malicious packets in a passive way that does not need to respond to received packets. As a result, compared with those conventional active methods that have to respond to received packets to complete a firewall function, the present invention will cause much less impact on the transmission speed of normal network packets.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance over the conventional structure and further complies with the patent application requirements and is submitted to the Patent and Trademark Office for review and granting of the commensurate patent rights.

What is claimed is:

1. A network malicious behavior detection method, which is implemented by a networking system having a path control module, a packet characteristic extraction module, a mirroring module, a packet characteristic checking module and a package behavior analysis module, the method including:

using the packet characteristic extraction module to get data in at least one layer of each piece of network packet to generate a characteristic data segment for each piece of the network packet, the layer being selected from a group consisting of the network layer, the transmission layer and the data link layer;

using the packet characteristic checking module to check each piece of the characteristic data segment to determine whether a protocol payload contained therein matches an element in a predetermined protocol payload set, if the check result is true, drive the mirroring module to generate a mirror packet according to a piece of the network packet corresponding to the check result, and if the check result is false, drive the path control module to enable a piece of the network packet corresponding to the check result to be transferred to a target device; and using the packet behavior analysis module to perform a malicious behavior detecting process on at least one piece of the mirror packet, if the check result is true, drive the path control module to block a transfer of at least one piece of the network packet corresponding to the check result to the target device, and if the check result is false, drive the path control module to enable at least one piece of the network packet corresponding to the check result to be transferred to the target device.

2. The network malicious behavior detection method as disclosed in claim 1, wherein the predetermined protocol payload set includes an ARP payload, an ICMP payload, a TCP payload with a SYN being 1, and a UDP payload with a destination network address containing a port number of 53.

3. The network malicious behavior detection method as disclosed in claim 1, wherein the malicious behavior includes a trait selected from a group consisting of a plurality of the mirror packets with a same source address but different destination addresses appear within a predetermined period of time, a plurality of the mirror packets with a same source address, a same destination address but different port addresses appear within a predetermined period of time, a piece of the mirror packet having a source address in a blacklist, a piece of the mirror packet having a source address not found in a whitelist, a plurality of the mirror packets corresponding to a plurality of the network packets issued from a network device requesting a plurality of non-existing domain names within a predetermined period of time, a plurality of the mirror packets corresponding to a plurality of the network packets issued from a network device requesting at least one non-existing domain name in every day of a plurality of consecutive days, and a plurality of the mirror packets corresponding to a plurality of the network packets issued from a plurality of network devices requesting at least one same non-existing domain name.

4. The network malicious behavior detection method as disclosed in claim 1, further including: using a traffic flow detection module to let all the network packets be put into the packet behavior analysis module to undergo the malicious behavior checking process when a detected traffic flow of the network packets is lower than a threshold; or using the packet characteristic extraction module to execute a flow detection process to obtain a traffic flow value of the network packets, and let each piece of the network packet be processed by the mirroring module to generate a piece of the mirror packet when the traffic flow value is lower than a threshold; or using the packet characteristic checking module to execute a flow detection process to obtain a traffic flow value of the characteristic data segments, and let each piece of the network packet be processed by the mirroring module to generate a piece of the mirror packet when the traffic flow value is lower than a threshold.

5. A networking system, which is operable on a network and has a path control module, a packet characteristic extraction module, a mirror processing module, a packet characteristic checking module, and a packet behavior analysis module to implement a network malicious behavior detection method, the method including:

using the packet characteristic extraction module to get data in at least one layer of each piece of network packet to generate a characteristic data segment for each piece of the network packet, the layer being selected from a group consisting of the network layer, the transmission layer and the data link layer;

using the packet characteristic checking module to check each piece of the characteristic data segment to determine whether a protocol payload contained therein matches an element in a predetermined protocol payload set, if the check result is true, drive the mirroring module to generate a mirror packet according to a piece of the network packet corresponding to the check result, and if the check result is false, drive the path control module to enable a piece of the network packet corresponding to the check result to be transferred to a target device; and using the packet behavior analysis module to perform a malicious behavior detecting process on at least one piece of the mirror packet, if the check result is true, drive the path control module to block a transfer of at least one piece of the network packet corresponding to the check result to the target device, and if the check result is false, drive the path control module to enable at least one piece of the network packet corresponding to the check result to be transferred to the target device.

6. The networking system as disclosed in claim 5, wherein the path control module, the packet characteristic extraction module, and the mirroring module are implemented in a switch or a router.

7. The networking system as disclosed in claim 5, wherein the packet characteristic checking module and the packet behavior analysis module are implemented in a same information processing device or different information processing devices.

8. The networking system as disclosed in claim 5, wherein the predetermined protocol payload set includes an ARP payload, an ICMP payload, a TCP payload with a SYN being 1, and a UDP payload with a destination network address containing a port number of 53.

9. The networking system as disclosed in claim 5, wherein the malicious behavior includes a trait selected from a group consisting of a plurality of the mirror packets with a same source address but different destination addresses appear within a predetermined period of time, a plurality of the mirror packets with a same source address, a same destination address but different port addresses appear within a predetermined period of time, a piece of the mirror packet having a source address in a blacklist, a piece of the mirror packet having a source address not found in a whitelist, a plurality of the mirror packets corresponding to a plurality of the network packets issued from a network device requesting a plurality of non-existing domain names within a predetermined period of time, a plurality of the mirror packets corresponding to a plurality of the network packets issued from a network device requesting at least one non-existing domain name in every day of a plurality of consecutive days, and a plurality of the mirror packets corresponding to a plurality of the network packets issued from a plurality of network devices requesting at least one same non-existing domain name.

10. The networking system as disclosed in claim 9, wherein the blacklist includes a network address or a domain name of a command-and-control server associated with a malware.

11. The networking system as disclosed in claim 5, wherein the network malicious behavior detection method further includes: using a traffic flow detection module to let all the network packets be put into the packet behavior analysis module to undergo the malicious behavior checking process when a detected traffic flow of the network packets is lower than a threshold; or using the packet characteristic extraction module to execute a flow detection process to obtain a traffic flow value of the network packets, and let each piece of the network packet be processed by the mirroring module to generate a piece of the mirror packet when the traffic flow value is lower than a threshold; or using the packet characteristic checking module to execute a flow detection process to obtain a traffic flow value of the characteristic data segments, and let each piece of the network packet be processed by the mirroring module to generate a piece of the mirror packet when the traffic flow value is lower than a threshold.

12. The networking system as disclosed in claim 5, wherein the network is a local area network.

* * * * *